United States Patent [19]

Temple

[11] Patent Number: 4,508,363
[45] Date of Patent: Apr. 2, 1985

[54] ADJUSTABLE SEAT BELT ANCHORAGE

[75] Inventor: John D. Temple, Carlisle, England

[73] Assignee: ASE (UK) Limited, Cumbria, England

[21] Appl. No.: 465,610

[22] Filed: Feb. 10, 1983

[30] Foreign Application Priority Data

Feb. 11, 1982 [GB] United Kingdom ............... 8203979

[51] Int. Cl.³ ............................................ A62B 35/02
[52] U.S. Cl. ............................... 280/808; 297/468; 297/483
[58] Field of Search ............... 280/801, 804, 808; 297/468, 473, 483, 486

[56] References Cited

U.S. PATENT DOCUMENTS 4,247,131  1/1981  Fieml ........................... 280/808
4,398,749  8/1983  Hipp et al. .................... 280/808

FOREIGN PATENT DOCUMENTS 2,362,641  3/1978  France ........................... 280/808
1497397    1/1978  United Kingdom ............... 280/808

Primary Examiner—David M. Mitchell
Assistant Examiner—Kenneth R. Rice
Attorney, Agent, or Firm—Young & Thompson

[57] ABSTRACT

An adjustable seat belt anchorage, particularly for the upper end of the shoulder belt of a vehicle seat belt system, comprises a channel-shaped track along which a carriage having a loop or other means for attachment of a seat belt is slidable. The track has a series of notches which are engageable by a protruding rib on the carriage. For adjustment, the carriage is rockable about an axis perpendicular to the direction of sliding movement to release the rib from engagement with the notches. A torsion spring acting between the carriage and the track biasses the rib and notches into engagement and the engagement is enhanced by the tension in the belt during use.

10 Claims, 5 Drawing Figures

U.S. Patent  Apr. 2, 1985  4,508,363
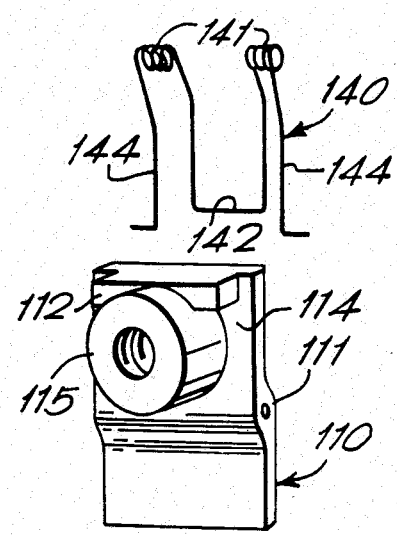
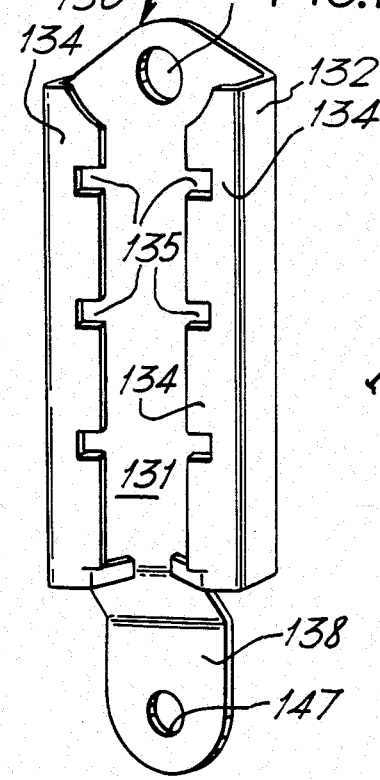
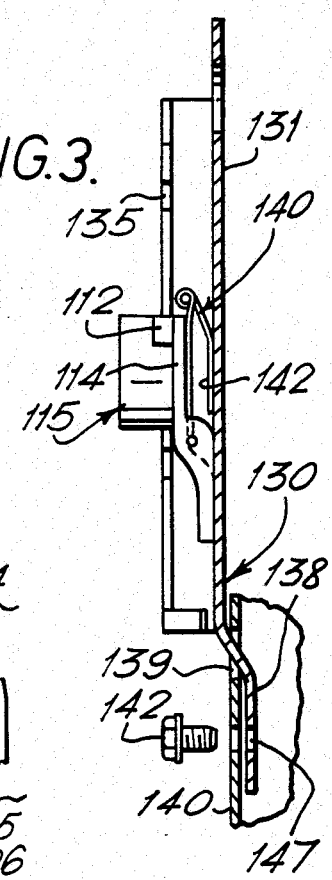
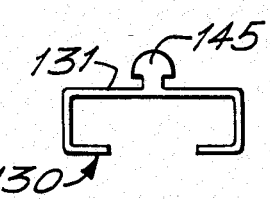
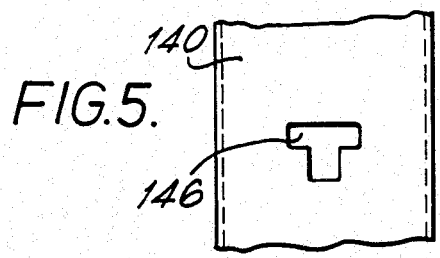

ADJUSTABLE SEAT BELT ANCHORAGE

BACKGROUND OF THE INVENTION

The invention relates to adjustable anchorages for seat belts such as are employed in vehicles, particularly road vehicles, for the protection of the occupants.

The invention relates particularly but not exclusively to an adjustable anchorage for the upper end of the shoulder belt of a vehicle seat belt system. The shoulder belt extends in use diagonally downwards from the anchorage across the torso of the user and may have one end secured to the vehicle by way of the anchorage. Alternatively, the belt may extend to the anchorage from a retractor, the anchorage providing a loop or slot through which the belt is guided.

It is an object of the present invention to provide an adjustable shoulder anchorage which is simple for the user to operate.

It is a further object of the invention to provide an adjustable shoulder anchorage which is readily manufactured and is reliable in operation.

SUMMARY OF THE INVENTION

The present invention provides an anchorage for a belt of a seat belt system, the anchorage comprising a carriage having a support for the belt, a track for guiding the carriage, locking means for locking the carriage against movement along the track, the carriage being rockable between a first position in which the locking means are engaged to lock the carriage and a second position in which the locking means are released to permit movement of the carriage, and resilient biassing means biassing the carriage towards its first position.

BRIEF DESCRIPTION OF THE DRAWINGS

An embodiment of the invention will now be described by way of example with reference to the drawings, of which:

FIG. 1 is an exploded perspective view of a vehicle seat belt shoulder anchorage;

FIGS. 2 and 3 are sectional side views, on a smaller scale, of the anchorage of FIG. 1;

FIG. 4 is a plan view of a modified form of the anchorage of FIGS. 1 to 3; and

FIG. 5 is a front view of a vehicle post to which the anchorage of FIG. 4 can be secured.

DESCRIPTION OF THE PREFERRED EMBODIMENT

The anchorage embodying the invention shown in FIGS. 1 to 3 comprises a track 130 in the general form of a channel member having a rear web 131, side webs 132 and front webs 134 extending inwardly from the forward edges of the side webs. The track 130 is provided with pairs of opposed cut-outs 135 in the free edges of front webs 134. The track 130 also has upper and lower extension portions of the rear web 131 with apertures 136,147 for securement of the track to the vehicle.

A carrier slide 110 received within the track 130 has upper and lower parallel plate portions, which are spaced apart so that the slide approximates in width to the spacing between the front 134 and rear 131 webs of the tracks, and which merge together by way of a central portion 11. A forward facing ridge 112 at the top of the upper slide portion 114 can be received in the cut-outs 135 and the ridge merges with a circular boss 115 also projecting forwardly from the upper slide portion. The boss projects beyond the front webs 134 and is tapped to receive a bolt 116 for supporting a bracket 104, which consists of a plate 105 folded around a running loop 106 for a seat belt 101 (see FIG. 2). The plate 105 has an aperture which receives the bolt 116.

The forward projection of the ridge 112 is small enough for it to be received within the track 130 for movement therealong by pivotation of the slide about its central portion 111. This pivotation is opposed by a torsion spring 140 acting between the slide and the rear web 131 of the frame. The spring has two aligned coil portions 141 joined by a downwardly extending U-shaped intermediate portion 142 bent rearwardly to bear against the web 131 and having at their outer ends downwardly extending arm portions 144 which bear against the inner surface of the upper plate portion. At the lower ends of the portions, 144, out-turned ends are received in aligned apertures formed in side flanges at the central portion 111 of the slide.

As can be seen in FIG. 3, the spring 140 normally urges the carrier slide forwardly in the track so that the ridge 112 securely engages in the cut-outs 135. The forward component of tension in the belt 1 produced by the belt retracting force of the retractor (not shown) from which the belt 101 extends or by the user of the belt enhances this engagement. For movement along the track 130, the top of the slide is pivoted inwardly so that the ridge 112 lies inwardly of the front webs 134.

The track 130 of the anchorage is normally secured to the "B" post of the vehicle in which it is to be used, as by bolts (not shown) at each end extending through apertures such as aperture 136 in the rear web 131 of the track 130 into tapped holes in the post, which is usually box-sectioned.

It may be that only one such tapped hole is available and the lower end of the track may then be secured as shown in FIGS. 1 and 3 or FIGS. 4 and 5. In FIGS. 1 and 3, the track rear web 131 has a downwardly and rearwardly extending tong 138 for reception in a slot 139 (FIG. 3) in the front wall 140 of the vehicle "B" post. The tong 138 and the wall 140 can be provided with registering holes respectively, of which the hole 147 of the tong can be tapped, for reception of a bolt 142 of like fastener.

Instead, as shown in FIG. 4, the lower end of the rear web 131 has a rearwardly extending tong 145 with a neck receivable in the stem of a T-shaped slot 146 in the front wall 140 of the "B" post.

The anchorage described can include a cover 120, suitably of plastics material which makes a snap-fit over the bracket 104 as shown in FIG. 2.

It is evident that those skilled in the art will make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. Anchorage means for a belt of a seat belt system, said anchorage means comprising:

carriage means having support means for said belt, track means for guiding said carriage means for movement therealong, locking means for locking said carriage means against said movement along said track means, said locking means comprising a first locking element on said carriage means and a series of second locking elements spaced along said track means, said carriage means being rockable between a first position in which said first locking element is in engagement with a selected second locking position to lock said carriage means at a selected position on said track means and against said movement along said track means from said selected position and a second position in which said first locking element is released from said second locking element to permit said movement of said carriage means along said track means to a different selected position on said track means, and resilient biassing means biassing said carriage means into said first position.

2. The anchorage means of claim 1, wherein said support means, said first locking means, and the axis about which the carriage means is rockable are so located on said carriage means that tension in said belt tends to urge said first locking element into locking engagement with an adjacent one of said second locking elements.

3. The anchorage means of claim 2, wherein said track means has a front wall portion with a longitudinal slot therein through which slot said support means of said carriage means protrudes, said front wall slot having aligned notches in its opposite edges constituting a series of pairs of said second locking elements and said carriage means having corresponding protruding formations for engaging said notches and constituting a pair of said first locking elements.

4. The anchorage means of claim 3, wherein said track means further comprises a rear wall portion spaced from said front wall portion, said carriage means being captive between said front and rear wall portions.

5. The anchorage means of claim 4, wherein said carriage means has a first generally-planar portion, a second generally-planar portion extending in a second plane parallel to said first plane and displaced from said first plane in a direction laterally of said direction of movement of said carriage, and transitional portion between said first and second portions, said axis about which said carriage means is rockable extending through said transitional portion.

6. The anchorage means of claim 5, wherein said resilient biassing means comprise a spring acting between said carriage means and said rear wall of said track means.

7. The anchorage means of claim 6, wherein said support means and said first locking element are on said first portion of said carriage means and said spring comprises a torsion spring having first and second arm portions engaged with the rear of said first portion and an intermediate portion engaged with said rear wall of said track means.

8. Anchorage means for a belt of a seat belt system, said anchorage means comprising:

carriage means having support means for said belt, track means for guiding said carriage means for movement therealong, said track means having a front wall portion with a longitudinal slot therein, through which slot said support means of said carriage means protrudes, and a rear wall portion spaced from said front wall portion, said carriage means being captive between said front and rear wall portions, locking means for locking said carriage means against movement along said track means and comprising a series of pairs of notches in said front wall portion, said pairs of notches being spaced apart along said track means and the notches of each said pair being formed in respective edges of said slot and being aligned with each other transversely thereof, and corresponding protruding formations on said carriage, said carriage means being rockable between a first position, in which said corresponding protuding formations are in engagement with respective notches of a selected pair of said notches at a selected position on said track means and said carriage is locked against movement along said track means from said selected position, and a second position, in which said corresponding protruding formations are released from said pair of notches to permit said movement of said carriage means along said track means to a different selected position on said track means, and resilient biassing means comprising a spring acting between said carriage means and said rear wall portion of said track means, said support means, said corresponding protruding formations and the axis about which said carriage means is rockable being so located on said carriage means that tension in said belt tends to urge said corresponding protruding formations into locking engagement with a corresponding pair of said notches.

9. The anchorage means of claim 8, wherein said spring comprises a torsion spring having first and second arm portions engaged with the rear of said carriage and an intermediate portion engaged with said rear wall portion of said track means.

10. Anchorage means for a belt of a seat belt system, said anchorage means comprising:

carriage means having support means for said belt, track means for guiding said carriage means for movement therealong, said track means having a front wall portion with a longitudinal slot therein, through which slot said support means of said carriage means protrudes, and a rear wall portion spaced from said front wall portion, said carriage means being captive between said front and rear wall portions and having a first generally-planar portion, a second generally-planar portion extending in a second plane parallel to said first plane and displaced from said first plane in a direction laterally of said direction of movement of said carriage, and a transitional portion between said first and second portions, said support means being on said first generally-planar portion, locking means for locking said carriage means against movement along said track means and comprising a series of pairs of notches in said front wall portion, said pairs of notches being spaced apart along said track means and the notches of each said pair being formed in respective edges of said slot and being aligned with each other transversely thereof, and corresponding protruding formations on said carriage means, said carriage means being rockable about an axis extending through said transitional portion and said are in engagement with respective notches of a selected pair of said notches at a selected position on said track means and said carriage is locked against movement along said track means from said selected position, and a second position in which said corresponding protruding formations are released from said pair of notches to permit said movement of said carriage means along said track means to a different selected position on said track means, and wall portion of said track means, said torsion spring having first and second arm portions engaged with the rear of said first portion of said carriage means and an intermediate portion engaged with said rear wall portion of said track means;

said support means, said corresponding protruding formations and the said axis being so located on said carriage means that tension in said belt tends to urge said corresponding protruding formations into locking engagement with a corresponding pair of said notches.

* * * * *